Aug. 28, 1956 P. MOLLA 2,760,494
MACHINE FOR THE APPLICATION OF IGNITER DISCS TO CIGARETTES
Filed March 4, 1954 11 Sheets-Sheet 1

INVENTOR
PIETRO MOLLA
BY *Robert H. Jacob*
AGENT

Aug. 28, 1956 P. MOLLA 2,760,494
MACHINE FOR THE APPLICATION OF IGNITER DISCS TO CIGARETTES
Filed March 4, 1954 11 Sheets-Sheet 6

INVENTOR
PIETRO MOLLA
BY Robert H. Jacob
AGENT

Aug. 28, 1956 P. MOLLA 2,760,494
MACHINE FOR THE APPLICATION OF IGNITER DISCS TO CIGARETTES
Filed March 4, 1954 11 Sheets-Sheet 7
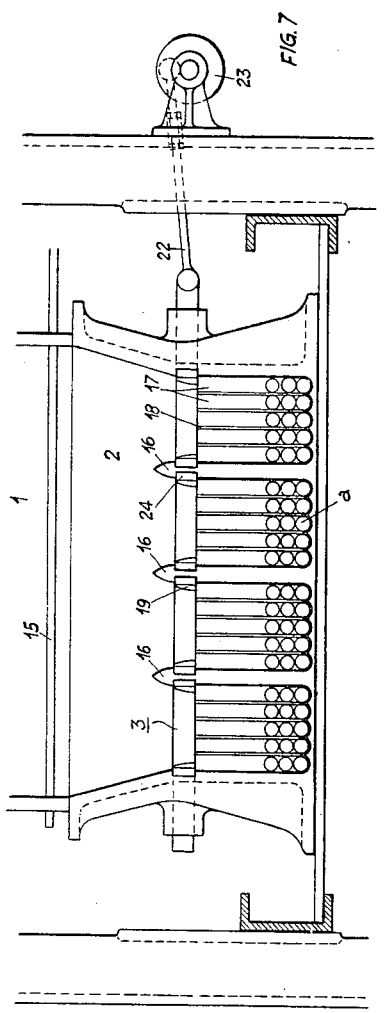
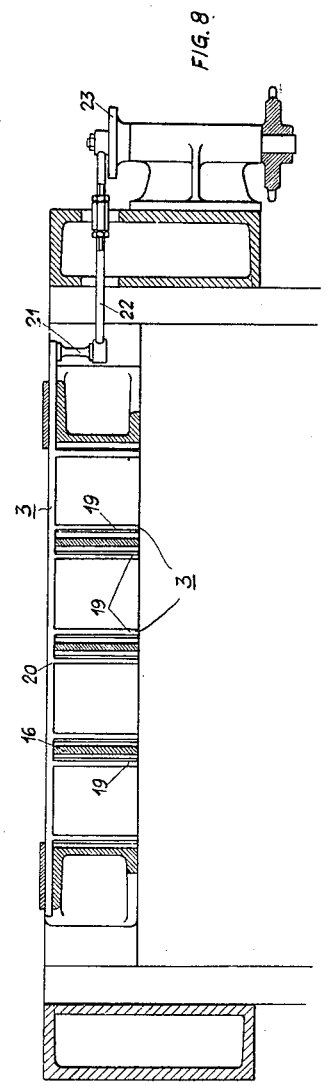
INVENTOR
PIETRO MOLLA
BY Robert H. Jacob
AGENT Aug. 28, 1956  P. MOLLA  2,760,494
MACHINE FOR THE APPLICATION OF IGNITER DISCS TO CIGARETTES
Filed March 4, 1954  11 Sheets-Sheet 8
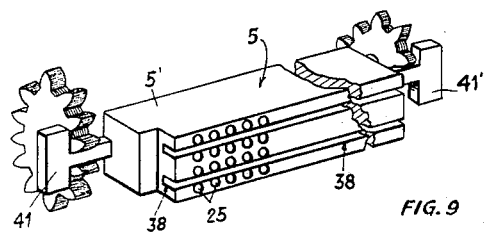
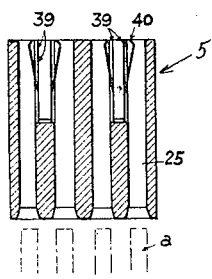
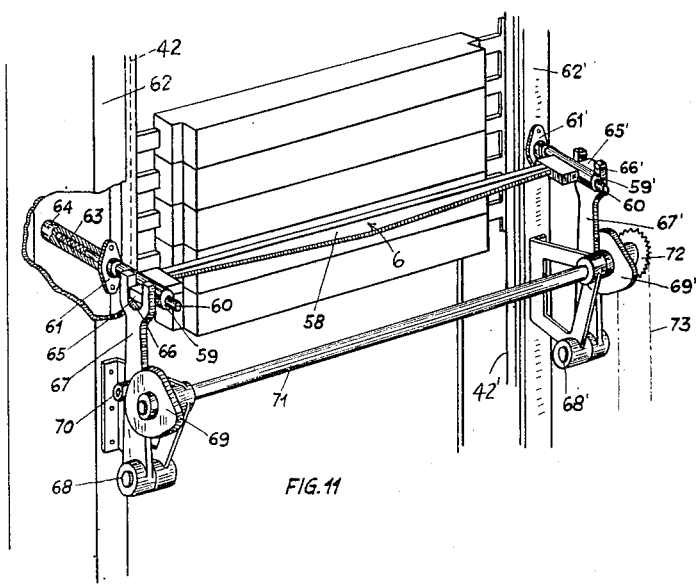
INVENTOR
PIETRO MOLLA
BY
AGENT Aug. 28, 1956 P. MOLLA 2,760,494
MACHINE FOR THE APPLICATION OF IGNITER DISCS TO CIGARETTES
Filed March 4, 1954 11 Sheets-Sheet 9
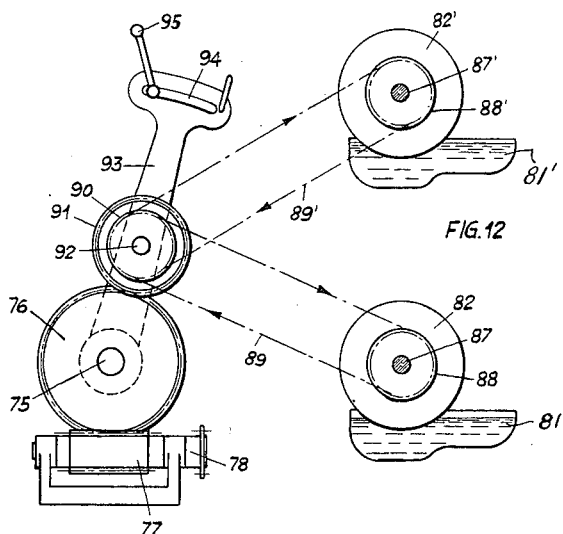
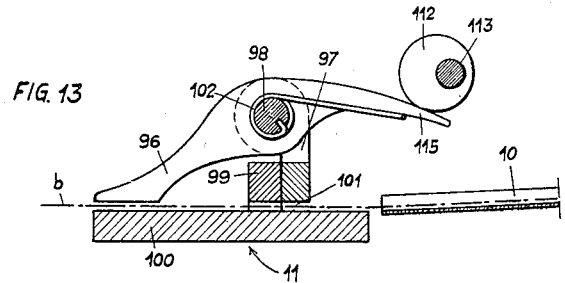
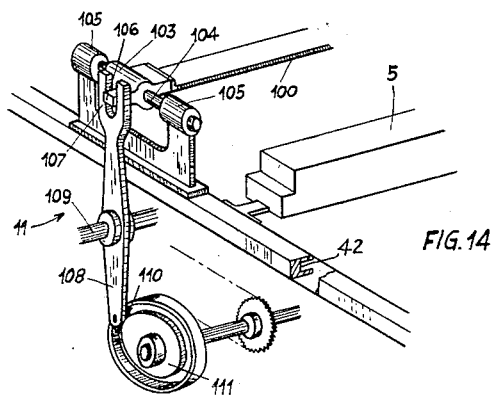
INVENTOR
PIETRO MOLLA
BY Robert H. Jacob
AGENT Aug. 28, 1956  P. MOLLA  2,760,494
MACHINE FOR THE APPLICATION OF IGNITER DISCS TO CIGARETTES
Filed March 4, 1954  11 Sheets-Sheet 10

INVENTOR
PIETRO MOLLA

BY Robert K. Jacob
AGENT

Aug. 28, 1956 P. MOLLA 2,760,494
MACHINE FOR THE APPLICATION OF IGNITER DISCS TO CIGARETTES
Filed March 4, 1954 11 Sheets-Sheet 11

INVENTOR
PIETRO MOLLA
BY Robert H. Jacob
AGENT

United States Patent Office 2,760,494
Patented Aug. 28, 1956

2,760,494

MACHINE FOR THE APPLICATION OF IGNITER DISCS TO CIGARETTES

Pietro Molla, Pontenuovo di Magenta, Italy, assignor to S. A. F. F. A.-S. p. A. Fabbriche Fiammiferi ed Affini, Milan, Italy Application March 4, 1954, Serial No. 414,096

Claims priority, application Italy March 7, 1953

18 Claims. (Cl. 131—88)

It is an object of this invention to provide an automatic machine suitable for the continuous and multiple application of small inflammable discs to one end of normal cigarettes, so as to give a cigarette which is self lighting, or that is, which can be lighted, without the use of matches, by rubbing the end carrying the inflammable disc on a rough surface of a special mixture which is applied on the same container as the cigarettes are packed in.

The small igniter discs, which are made up of various chemical substances forming an active mixture which is capable of lighting when rubbed against the rough surface of another complementary mixture (the same as the principle of ordinary safety matches) and of another combustible mixture which has the function of maintaining the combustion for sufficient time for the tobacco in the cigarette to start burning, are obtained on the machine itself, from strips of inflammable material prepared beforehand on a special machine. The machine described and claimed in United States patent application Serial No. 414,095 entitled Machine for Preparation of Igniter Strips for Use in the Production of Auto-Lighting Cigarettes, which was filed by the applicant on the same date as this application, is very suitable for this work.

The feed of the cigarettes to the machine is automatic and follows a previous loading of a certain number of cigarettes by hand into a special container which is situated above the hopper for the machine. Equally automatic is the feed of the strips of inflammable material from which the small discs are obtained by earlier arrangement of these strips in the special loading guides.

More particularly, the machine according to the invention includes a device for loading the cigarettes and arranging them before introduction automatically to the machine, a framework, a continual conveyor system which carries the cigarettes through the various phases of the work, a gumming unit to place a layer of adhesive on the end of the cigarettes, a device for the automatic feed of the ignition strips, a mechanism for the cutting out of the ignition discs and for their application to the cigarettes, a device for the independent feeding of the conveyor elements of the cigarettes after the capping phase, a device for removing the cigarettes from the framework after they have been capped and an off loading conveyor for the finished product.

In one of its preferred embodiments, the machine according to the invention comprises:

1. A device for loading the cigarettes comprising a loading container for the introduction of the cigarettes into the machine, a hopper so arranged that it arranges and lines up the cigarettes for the next phase of putting them into the framework and a vibrator to assist the descent of the cigarettes.

2. A framework device made up of special pushers which introduce at each stroke, a set number of cigarettes into a row of holes in the conveyor elements.

3. A conveyor system for the intermittent feed of the cigarettes through the various working phases and along the travel of the drying operation, formed by conveyor elements which are suitably holed or in which a certain number of holes are placed so as to have an equal distance either between any two rows on one element or between two rows on adjacent elements and with a certain number of holes suitably spaced per row and which holes have a diameter and entry so as not to damage the cigarettes during their introduction and discharge and also provided with a means of holding the cigarettes firm, in the desired position during the operations.

4. A levelling device which, being synchronised with the movement of the conveyor elements, lines up all the heads of cigarettes in one row on the same plane.

5. An adhesive applying unit, comprising one or more rows of adhesive applying devices which, in one or more applications, damp the ends of the cigarettes with adhesive as they project from the conveyor elements and means for the transformation of the intermittent motion of the endless chain of conveyor elements into continual movement in that section in which works the gumming unit.

6. A device for the automatic feed of the ignition strip which, loaded by hand onto guides placed on the upper level of the machine, is made to advance automatically and in step with the machine's other movements, under the cutter mechanism of the capping unit.

7. A capping unit comprising a disc punching apparatus which cuts automatically from the strips the number of igniter discs corresponding to the number of cigarettes in a row of holes in a conveyor element, letting them drop, centered accurately on the ends of the cigarettes which have been previously gummed.

8. A device for the feed and for the exact stopping on a centered position and also of the feed movement of the conveyor elements, immediately before, during and immediately after the capping phase, with the purpose of assuring a perfect alignment of the cigarettes in a row with the holes corresponding to the hollow punches of the capping unit.

9. A device for pressing the ignition discs, made up of a presser bar carrying as many pressers, which are spring loaded, as there are holes in a conveyor element, having the function of assuring a good adhesion of the discs on the ends of the gummed cigarettes.

10. A path for drying the adhesive used for the fixing of the igniter discs including the path travelled by the series of conveyor elements on the horizontal level above the machine, on the lower horizontal path and for the short path descending vertically.

11. A device for the unracking of the cigarettes, similar to the racking or framework positioning device, comprising a certain number of pushers which, at each stroke of the machine, enter the holes to some depth and expel the capped cigarettes which are in a row of holes.

12. An off loading transporter or conveyor for the collection of the capped cigarettes ejected by the unracking device at each stroke of the machine (in groups of equal number), from where an operator takes them every now and again for packeting.

The invention will be described in one of its embodiments, purely as an example and thus not in any way in a limiting sense, in connection with the following drawings in which:

Fig. 7 is a front view of the cigarette loading hopper;

Fig. 8 is a drawing showing in detail the device for shaking the cigarettes within the hopper;

Fig. 9 is a partial view in perspective of a cigarette conveyor element;

Fig. 10 is an enlarged detail of the cigarette carrier holes in a conveyor element which has been cross sectioned;

Fig. 11 is a sketch in perspective of the leveller device for the cigarettes when racked;

Fig. 12 shows diagrammatically the drive parts of the adhesive applying units;

Fig. 13 shows diagrammatically the feed clamps of the ignition strips;

Fig. 14 is a diagrammatic view in perspective of the mechanism driving the clamp carrier bar for the strip feed;

The machine which is herein described represents a particular case of a machine designed to effect contemporaneous application of ignition discs on 20 cigarettes having normal round section; it is obvious that such a machine can be arranged with conveyor elements which have a greater or less number of holes in one line or row or with a greater or less number of lines or rows or with a different placing of the holes, so that one can apply ignition discs to a greater or less number of cigarettes than that mentioned in the description or to cigarettes having a different section to that described above and that this can be done without altering the principles on which are based the conception and functioning of the machine.

The description which follows further prescinds all those parts of the machine, such as motors, transmissions, speed reduction units and other mechanical contrivances of a general character which are not strictly in relation to the devices directly concerned in the various phases of the work.

Figure 3:
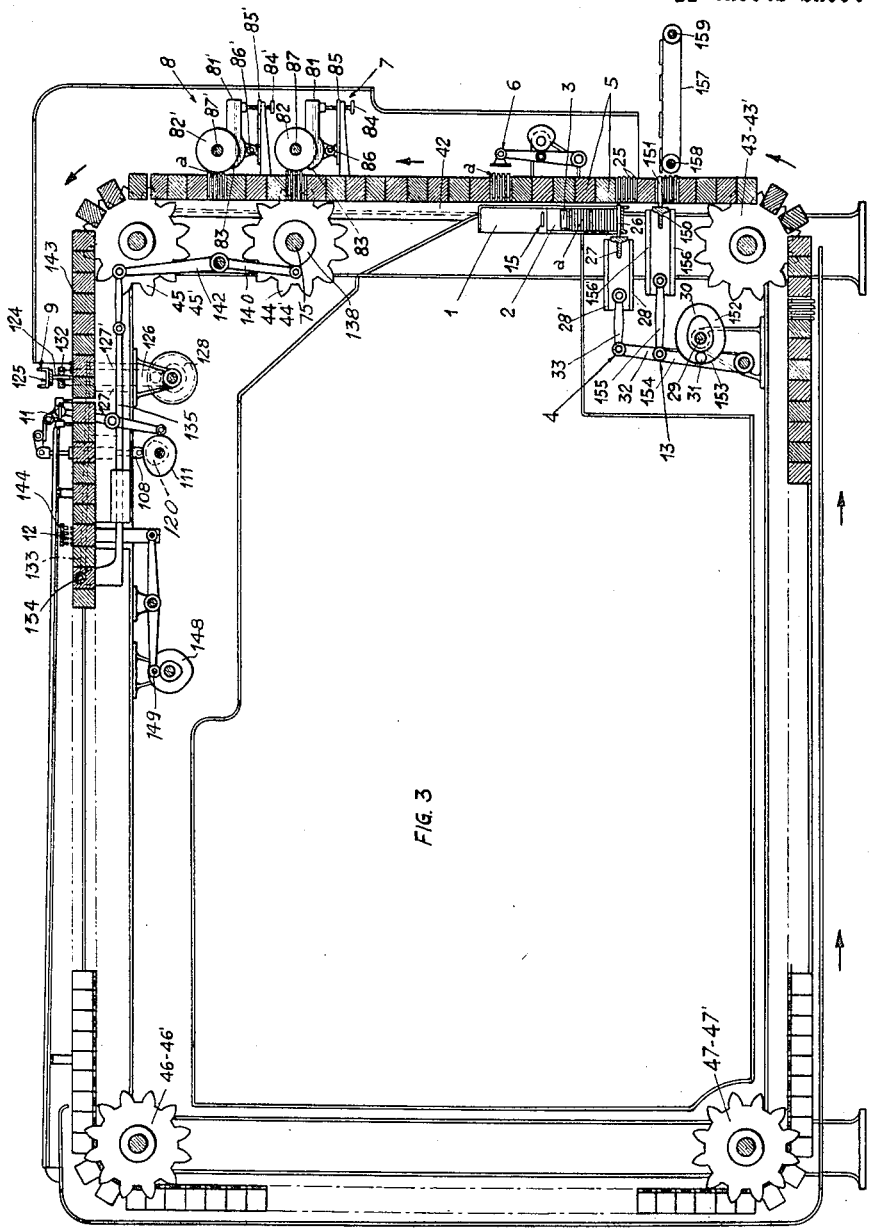
Fig. 3 is a partial vertical section of the machine through the line 3—3 in Fig. 2 in which for greater clarity of drawing the drive and transmission parts have been omitted.

The loading of the cigarettes is previously done by hand into a special wooden container 1 (Fig. 1) which has a withdrawable bottom 15 (Figs. 3 and 7). The container 1, filled with cigarettes a, is placed above a hopper 2 so that, by withdrawing the bottom 15, the cigarettes fall into the hopper 2. This (Fig. 7) is arranged so that, under gravity, the cigarettes received from the container 1, where they are placed one on top of the other, are sub-divided into the four sections by separators 16 and, within each section are divided into 5 divisions 17, being limited by the thin separators 18, between which the cigarettes a are housed individually. To assure the continuity of the cigarettes between the divisions 17, a matter which might be held up by obstructions created by two cigarettes bridging the entrance of the division itself, in the hopper 2 is placed (Fig. 3) a vibrator 3. This is made up of bars 19 (Fig. 8) fitted to the stem 20 which, being connected by means of the pin 21 to the link 22 mounted on the eccentric 23, creates a backwards and forwards motion. The small bars 19, following the vibratory motion of the stem 20, move inside the hollows 24 (Fig. 7) which are incorporated in the separators 16 and on the lateral walls of the hopper 2 in such a way as to create the shaking of the cigarettes and to ensure their going into the canals or slots between the separator walls 18. All the 20 cigarettes a, divided into four sectors of 5 cigarettes each sector, which in the hopper find themselves on the bottom of the divisions 17, are perfectly lined up with a row of holes 25 (see Figs. 3, 9 and 10), which have a diameter slightly larger than that of the cigarettes and having an entry which is flared to ease the introduction of the cigarettes into one of the conveyor elements 5 forming a conveyor system.

On the opposite side the same cigarettes a are lined up with a row of framework pushers 26 (Fig. 3) carried on a bar 27 which, sliding within the guides 28 and 28' is operated by the shaft 29 through the slotted cam 30, the roller 31 and the lever 32 and link 33, there resulting a backwards and forwards motion, synchronised with the intermittent movement of the conveyor system made up of the conveyor elements 5. This mechanism constitutes the framework unit 4 shown in Fig. 1.

In the forwards movement of the bar 27, whose phase is determined by the slotted cam 30, taking place whilst the conveyor element 5 is stationary, the framework pushers 26 push the 20 cigarettes which have been deposited on the bottom of the slots 17 into the corresponding 20 holes in the conveyor element 5.

The shaft 29 (Fig. 4) is driven by the motor unit through the sprocket wheel 176, the chain 34, the sprocket wheel 35, the helical gear 36 and the endless worm 37. On the shaft 29 (Fig. 5) are mounted the slotted cams 30 and 30' which work the framework unit 4 already shown.

The individual elements 5 making up the conveyor system carrying the cigarettes (Fig. 9) are made of a metallic block 5' having four rows of holes 25, twenty per row. The twenty holes or apertures in each row are sub-divided into four sections of five holes each. The parallelly arranged rows in each element and the adjacent rows in engaging elements are equally spaced from each other. Between the first and second of the rows of holes 25 and between the third of fourth rows are cut grooves 38 which serve for the insertion, corresponding to each sector of 5 cigarettes, of a special strip 39 bent into the form of a U (Fig. 10), in which are cut the small tongues 40 which are inserted into the corresponding holes 25, and function as springs to hold the cigarettes a which are inserted by the framework 4.

The block 5' carries at its ends two T form extensions 41 and 41' which slide in lateral guides 42 and 42' (Fig. 2) to form a conveyor system. The motion of the conveyor elements 5 is given (Fig. 3) by the successive meshing of the T extensions 41 and 41' respectively into the pairs of toothed wheels having a special profile 43—43', 45—45', 46—46', and 47—47' which are driven off the main transmission of the machine through similar mechanism giving the conveyor elements 5 a motion in jerks or intermittent movement, and into the toothed wheels 44—44' which give to the conveyor elements 5 a continuous motion throughout the section where the gumming operation takes place.

The special profile toothed wheels 43 and 43' are driven off the main shaft 48 (Fig. 5), which in its turn takes its motion from the shaft 29, already shown, through the conical couple 49 and 49', by means of a screw conveyor 50 operating a divider disc 51 on whose shaft are respectively keyed the toothed wheels 43 and 43'. The same identical arrangement is mounted on the other end of the shaft 48 for operating the wheels 47 and 47'. It is obvious that the screw conveyor 50 with its special screw acts on the divider disc 51, through a pre-determined number of small rollers 53, so as to give an intermittent motion calculated to obtain a jerk feed of the conveyor elements 5 according to the set pitch corresponding to the distance between the centres of two successive rows of holes 25.

The upper toothed wheels 45 and 45' are keyed onto the shaft 57 (Fig. 4) which takes the movement from the shaft 52, which has been already illustrated in Fig. 3, through a conical couple of gears 54 and 54', the shaft 55 and the conical gears 56 and 56'. The same mechanism is applied for the drive of the toothed wheels 46 and 46'.

It is obvious that the conveyor elements 5 at the moment, in which they are operated by the gear couples 43—43', 44—44', 45—45', 46—46' and 47—47' create, due to the push of the other elements which are free, the feed of the whole chain.

The cigarettes a which are in twenties inserted into the holes 25 by the pushers (Fig. 3), project with their ends out of the holes 25 towards the outside of the machine to allow the later operations of capping (Fig. 1) by the gumming units 7 and 8, the cutter unit 9 which also applies the ignition disc, and the pressure unit 12 for the disc. However for a good execution of these operations and for specially the gumming phase it is necessary that all the cigarettes racked in the conveyor elements 5 project in an identical manner and to the same amount from the holes 25 and to this purpose the machine is fitted with a levelling device 6 which has the special duty of bringing all the cigarette ends to the same level before the discs are placed on the ends of the cigarettes. This device 6 (Fig. 11) is made up of a leveller bar 58, which lines up the ends of the cigarettes by pressure. The bar 58 has at its ends the sleeves 59 and 59' in which are fitted spring loaded pins 60 and 60' which slide within the supports 61 and 61' which are actually bearings and are fixed to the shoulders 62 and 62'. The pins 60 and 60' rest with their ends against springs 63 and 63' which are in turn housed in the housings 64 and 64'. On the sleeves 59 and 59' are found the spacers 65 and 65', which ride in the forks 66 and 66' of the levers 67 and 67'. These levers being pinned with a fulcrum at 68 and 68' and being operated by the cams 69 and 69' through the rollers 70 and 70', take on, due to the return action of the springs 63 and 63', an alternating motion like a pendulum which controls the back and forward motion of the leveller bar 58, which, at each stroke of the machine, presses the cigarettes in the holes 25 of the conveyor elements 5, making them all project as much as is needed to bring the ends to the same level. The cams 69 and 69' are mounted on the shaft 71 at the end of which is fitted a sprocket wheel 72, driven by the chain 73 and the sprocket wheel 74 (Fig. 5), of the shaft 29 already described.

The gumming sets or units 7 and 8 are placed in front of the machine (Fig. 2), before the section of continuous conveyor elements 5 between the pairs of toothed wheels 44 and 44', and 45—45' (Fig. 3) and this because in this section the conveyor system 5 advances continuously and not intermittently as does the rest of the system. The continuity of movement of the feed is imperative for this operation so as to give uniformity to the gumming. The change from intermittent to continuous motion is done by a pair of special profile toothed wheels 44 and 44' which are fitted on the shaft 75 (Fig. 4) which, through the cylindrical toothed wheel 76, the worm 77, the sprocket wheel 78, the chain 79 and the sprocket wheel 80, takes its motion from the shaft 48 (Fig. 5) already shown and which, as is seen, works with a continuous rotation. The reciprocal distance between the axes of the sprockets 44—44' and 45—45' and the respective rotational speeds (one being a continuous movement and the other being in jerks) are calculated so that for each jerk forward of the sprockets 45—45' the conveyor element which is at the head of the pile of conveyor elements pushes upward with a continuous movement of the sprocket 44—44' to place itself in the position in which it is taken away by the teeth of the sprockets 45—45'. A clearance space is shown between the pile of parts brought forward and pushed upward by the continuous movement of the sprockets 44—44' and the conveyor element which has been taken between the teeth of the sprockets 45—45'. This clearance space is at a maximum as soon as the pair of sprockets 45—45' has made a jerk forward moving away the conveyor element which happens to be at the top of the pile of conveyor elements moved forward by the continuous movement of and supported by wheels 44—44'. In this precise movement a tooth of the sprockets 45—45' finds itself placed between the first and second conveyor elements of the pile of elements supported by the wheels 44—44', which are now in the correct position to remove, with the forward jerking action, the conveyor element which is at the head of the pile.

The operation for the application of the adhesive on the ends of the cigarettes is done in two steps by the adhesive applying units 7 and 8 (Fig. 1), of which the first applies a light surface of adhesive and the second repeats the operation to ensure uniformity of gumming.

Figure 2:
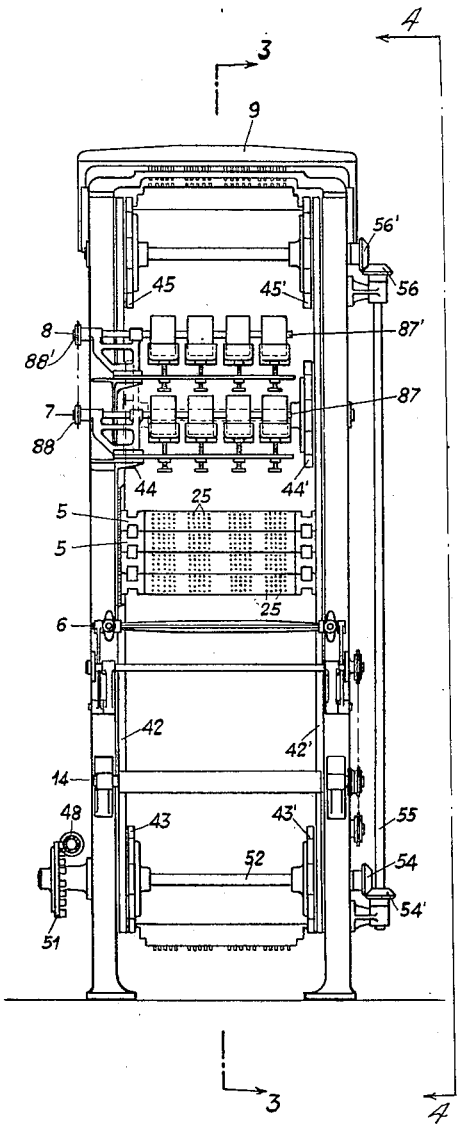
Fig. 2 is a detailed view of the machine seen from the front, from the off loading side.
Figure 4:
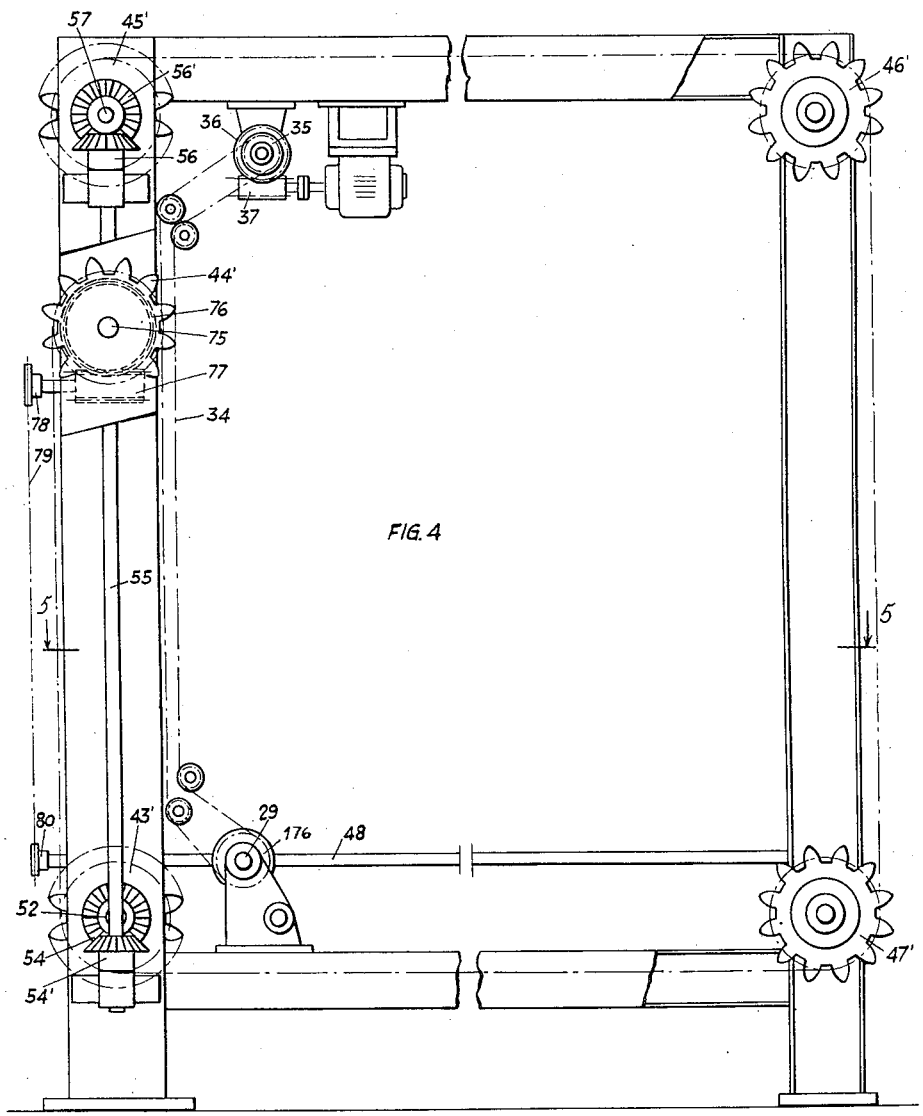
Fig. 4 is an elevational view of the machine looking in the direction of the arrows along the line 4—4 in Fig. 2, in which are shown only the drive and transmission parts.

The gumming units 7 and 8 are identical and each one is made up of four adhesive applying devices each, which moisten the five cigarettes making up a sector of each row of holes 25 of the conveyor elements 5 (Fig. 2). Gumming unit 7 is formed of a bath 81 (Fig. 3) to hold the adhesive, into which dips the roller 82 which carries a thin layer of adhesive and deposits it to the ends of the cigarettes a. On the edge of each bath 81 is fitted an angular scraper 83 functioning as an excess adhesive remover and which thus regulates the layer of adhesive deposited on the surface of the roller 82. This regulation is done by using the adjuster screw 84 which, being fitted into the support plate 85, enables the bath to be slightly turned around the pin 86 thus giving a greater or less distance between the scraper 83 and the roller 82. As shown in Fig. 3 the parts of the gumming unit 8 are identified as bath 81'; roller 82'; adjuster screw 84'; support plate 85' and pin 86'. The roller 82 of each adhesive applying unit 7 and the roller 82' of the adhesive applying unit 8 are respectively mounted on the shafts 87 and 87' (Fig. 2), which are driven through their respective sprocket wheels 88 and 88' (Fig. 12), the chains 89 and 89', the double toothed sprocket 90, solid with the cylindrical toothed wheel 91, and the cylindrical toothed wheel 76 already described (Fig. 4). The assembly formed by the cylindrical toothed wheel 91 and the sprocket wheel 90 (Fig. 12) turns around a pin 92 which is mounted on the lever 93 being pinned at one end on the shaft 75.

On the other end of the lever 93 is a slot 94 which allows, by means of a lock screw 95, the fixing in position of the lever 93 so as to give the right tension on the chains 89 and 89'. This also facilitates the removal of the chains 89 and 89' when the shafts 87 and 87' have to be dismounted, which carry the rollers 82 and 82'.

The conveyor elements 5, after a passage under continuous motion beneath the adhesive applying units 7 and 8, come again between the teeth of the toothed wheels 45 and 45' which retake up the movement of feed in jerks which is again necessary for the next operations.

Figure 6:
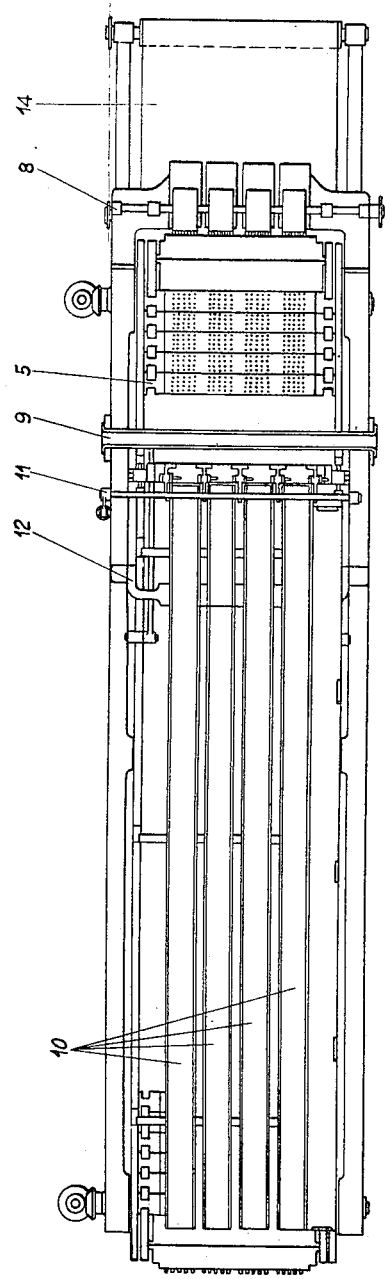
Fig. 6 is a diagrammatic view in plan of the machine.

The capping unit 9 (Fig. 1) cuts the discs of ignition strip b all having an equal diameter which is the same as that of the cigarettes and applies these discs with precision on the ends of the cigarettes which have been previously coated with an adhesive. The ignition strips b produced earlier on another special machine, for example on the machine which is claimed in United States patent application Serial No. 414,095 entitled "Machine for Preparation of Igniter Strips for Use in the Production of Auto-Lighting Cigarettes" filed by applicant on March 4, 1954, have a width equal to that of a sector taking in five cigarettes in a row of holes 25 in the conveyor elements 5 and are loaded onto the machine four at a time—with the purpose of covering the entire length of a row of twenty holes 25 of the conveyor element 5—in special feeding guides 10 (Fig. 6) placed on the upper horizontal plane of the machine being slightly inclined towards the cutter unit 9. The feed of the strips $b$ up to the underneath of the cutter unit 9 is done by a device 11 comprising (Fig. 13) a certain number of thin clamps 96 (usually two per strip), each of which is pinned at 98 on a forked support 97 and which is carried by the cross bar 99 which is solid with the plate 100.

Each strip $b$ passes through a special opening 101 cut in the cross bar 99 and finds itself between the plate 100 and the end of the thin clamps 96 which remain normally in the closed position due to the effect of the spring 102.

The bar 100 with all the clamps 96 effects an alternating motion given to it by a mechanism situated at the ends. To this end (Fig. 14) the bar 100 has at its two ends a sleeved part with a projection 103 which slides on the pin 104 which in turn is supported by the fork 105. Sleeve 103 is provided with a projection 106 which is arranged between the prongs 107 provided at one end of lever 108. Lever 108 is centrally pinned at 109 and is provided at its other end with a roller 110 which is guided within a slot of a grooved cam 111. The oscillating movement of lever 108 gives an alternating motor to bar 100 which carries clamps 96 used for the rhythmic feed of the strips. Naturally to avoid, during the return motion of the bar 100, that the strips are brought to the starting position, there is a device for lifting the thin clamps 96 and freeing of the strip at the moment the return motion starts. This device is made up of (Fig. 13) a roller 112 placed crossways which, being eccentric, rythmically carries out an oscillating motion which creates the lowering of the tail 115 of the thin clamp 96 thus giving a consequent raising of the other end or head which is holding the strip $b$.

Figure 15:
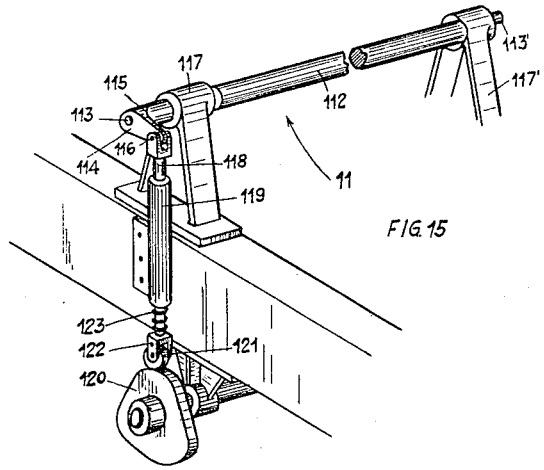
Fig. 15 is a diagrammatic view in perspective of the mechanism driving the eccentric shaft for the slackening of the clamps on the strip feed.

The oscillating motion of the eccentrically mounted cylinder or roller 112 (Fig. 15) is given to the lever 114 whose end is mounted on the end of the part 115 in whose end the pin 113 of the roller 112 is fitted and the other end of the lever arm 114 is joined to the fork joint 116. The part 115 is mounted on the bracket 117, whilst the fork joint 116 is connected to the bar 118 which slides inside the sleeve or hollow rod 119 and which rests on the cam 120, using the small roller 121 as a contact with the cam surface 120, the small roller 121 being fitted in the forked mounting 122.

Between the forked mounting 122 and the hollow rod or sleeve 119 a spring 123 gives the elasticity needed for a safe working of the connector rod 118. On the other end, the roller 112 rests simply with the eccentric pin 113 on a bracket support 117'.

Figure 1:
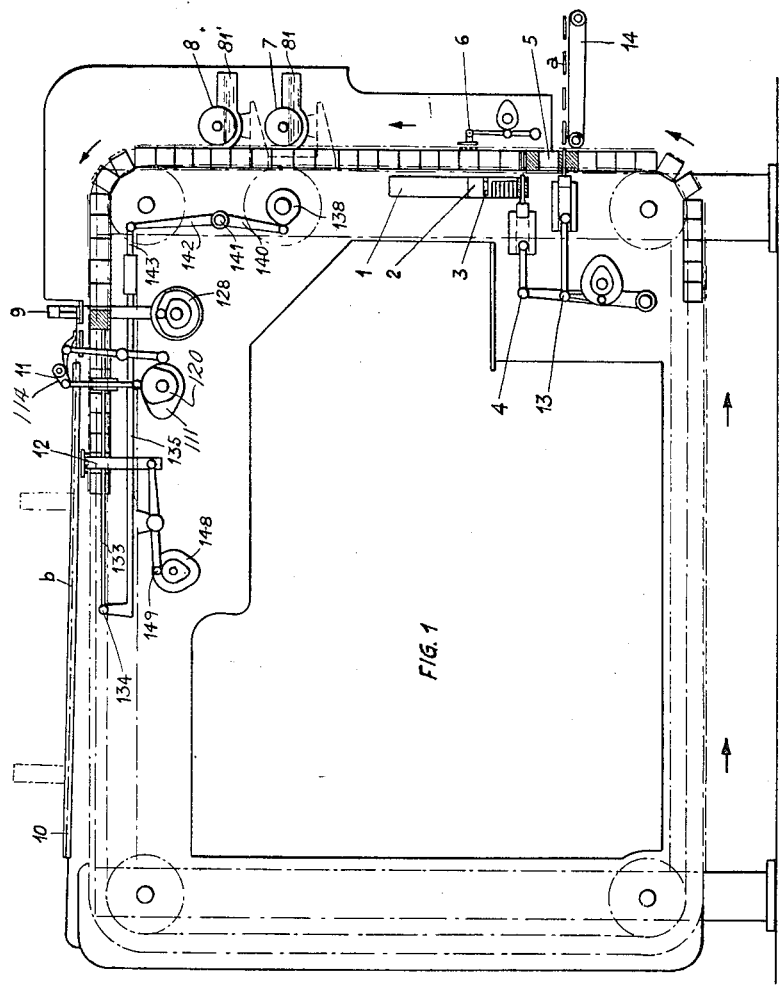
Fig. 1 is a diagrammatic view in elevation of the whole machine.
Figure 16:
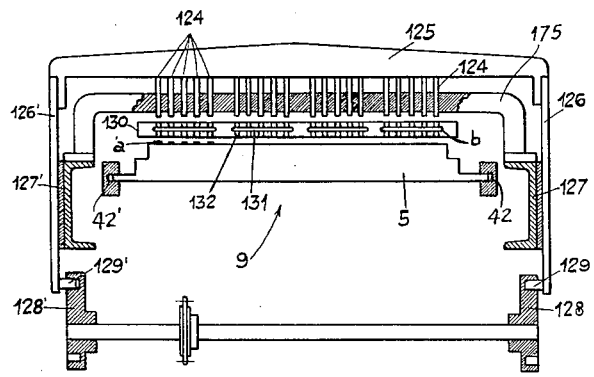
Fig. 16 is a sectional diagrammatic view of the capping unit.
Figure 17:
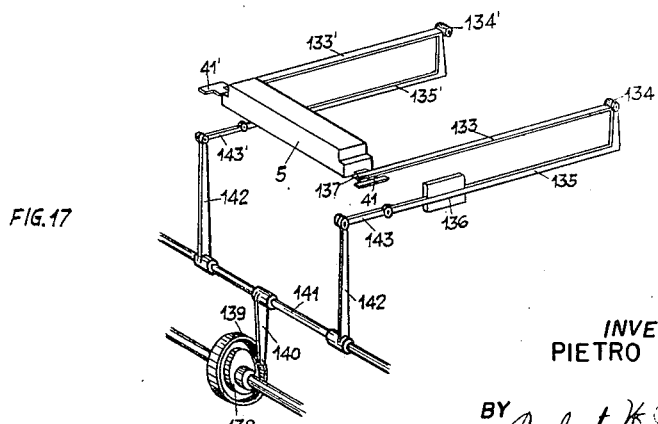
Fig. 17 is a diagrammatic view in perspective of the conveyor element feed mechanism which is in phase with the capping unit.

The four ignition strips $b$, rythmically fed by the spring clamps 96 up to the capping unit 9 (Fig. 3), are contemporarily cut by a series of twenty hollow punches 124 which are placed in groups of five and arranged to suit the positions of the holes 25 in the conveyor elements 5 (Fig. 16). The punches 124 are carried on the bar 125 which is fixed at its ends to two slides 126 and 126', moving between the guides 127 and 127', driven by slotted cams 128 and 128' through the rollers 129 and 129'. Punches 124 are supported and guided by an apertured plate 175 mounted on the framework of the machine adjacent bar 125. The strips $b$ pass through the openings 131 of guide 130 and which are also made to come in line with the punches 124. At each stroke of the machine and precisely between one feed and the next of the conveyor elements 5, the bar 125 lowers itself and the punches 124 cut the discs which are twenty in number, from the strip $b$ and, through the corresponding holes 132 made in the support plate and guide 130, these are deposited exactly on the ends of the cigarettes $a$ which are carried in the conveyor elements 5. In order that the discs remain firmly on the cigarettes after a capping operation a light pressure is applied to the disc capped cigarettes over a predetermined period of time by unit 12 (Fig. 1). The short period of time between the one and the next feed motion of the conveyor elements through the disc capping device has been found to be insufficient. For this reason the pressure mechanism 12 has been built to hold pressure on all four rows of cigarettes in a conveyor element at the same time. This time corresponds roughly to that of four feeds of the conveyor elements through the capping device. To provide this long time interval a break in the continuity of the conveyor element speed is necessary while maintaining unchanged the overall speed of the conveyor system. The machine is fitted with an accessory mechanism which detaches the conveyor element 5, immediately after the capping, from the elements which follow it and make it advance together with the front elements up to the toothed wheels 46—46'. This mechanism is composed of (Fig. 17) pawls or trip rods 133 and 133' which make a to and fro motion with a stroke and speed which is greater than that of the single feeds of the conveyor elements 5.

These trip rods 133 and 133' are pinned at 134 and 134' on a bracket 135—135' which slides between the guides 136—136'. In the forwards motion, the points 137—137' of the trip rods 133—133' catch in the extensions or notches 41—41' of the conveyor elements 5 and in the return motion drag the conveyor element 5 which has been capped, against the other conveyor elements so that, by the push action, it creates the feed of the conveyor elements to the toothed wheels which have a special profile 46—46'.

The to and fro motion of the brackets 135—135' is done by the action of a side slotted cam 138 which, through the roller 139, drives the lever 140 keyed to the opposite end of the shaft 141 which assumes an oscillating movement which is transmitted to the levers 142—142' which are keyed onto the end of the shaft 141 and pinned at the other end to the links 143—143', to which are connected the connecting rods 135—135'.

Figure 18:
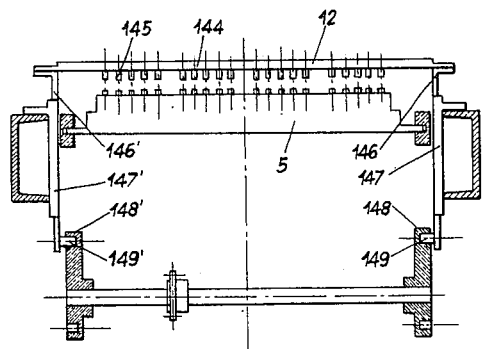
Fig. 18 is a diagrammatic view of the inflammable disc presser unit, shown in section.
Figure 20:
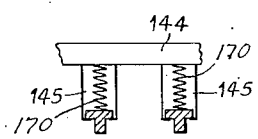
Fig. 20 is a diagrammatic partial view of the presser bar and spring loaded pressers.

After the application of the ignition discs to the end of the cigarettes, it is necessary to make sure of the good adhesion to the layer of adhesive by a light pressure which is exerted on the discs themselves. This pressure is given automatically by the unit 12 (Fig. 1) which is made up of a presser bar 144 (Fig. 18 and Fig. 20) to which are applied four rows of twenty small spring loaded pressers corresponding to the eighty cigarettes in a conveyor element 5. At every four strokes of the machine, the bar 144 lowers and the eighty pressers 145 which are each spring loaded by a spring 170, come against the ends of the eighty cigarettes in the conveyor element 5 at the same time lightly pressing the discs. The bar 144 is mounted on slides 146 and 146' which slide within the guides 147 and 147' and is driven by grooved cams 148—148' through the rollers 149 and 149'.

After this operation (Fig. 1), the conveyor elements 5, loaded with capped cigarettes, continue their travel on the remainder of the upper horizontal plane of the machine, on the rear side, descending, on the lower horizontal plane and on part of the front ascending side until they reach the unracking point or unit 13. During this travel the adhesive used for the adhesion of the caps of inflammable strip has had time to dry.

The unracking unit 13 is the same as the framework unit already described (Fig. 3). The bar 150 carrying the twenty pressers 151 which are fitted to match up with the holes 25 in the conveyor element 5, at each stroke of the machine, and exactly in the interval between the feed of one and the next conveyor element 5, thus contemporaneously with the racking phase, shifts forwards and, by means of the penetration of the pushers 151 into the holes 25 of the conveyor elements 5, eject twenty cigarettes.

Figure 5:
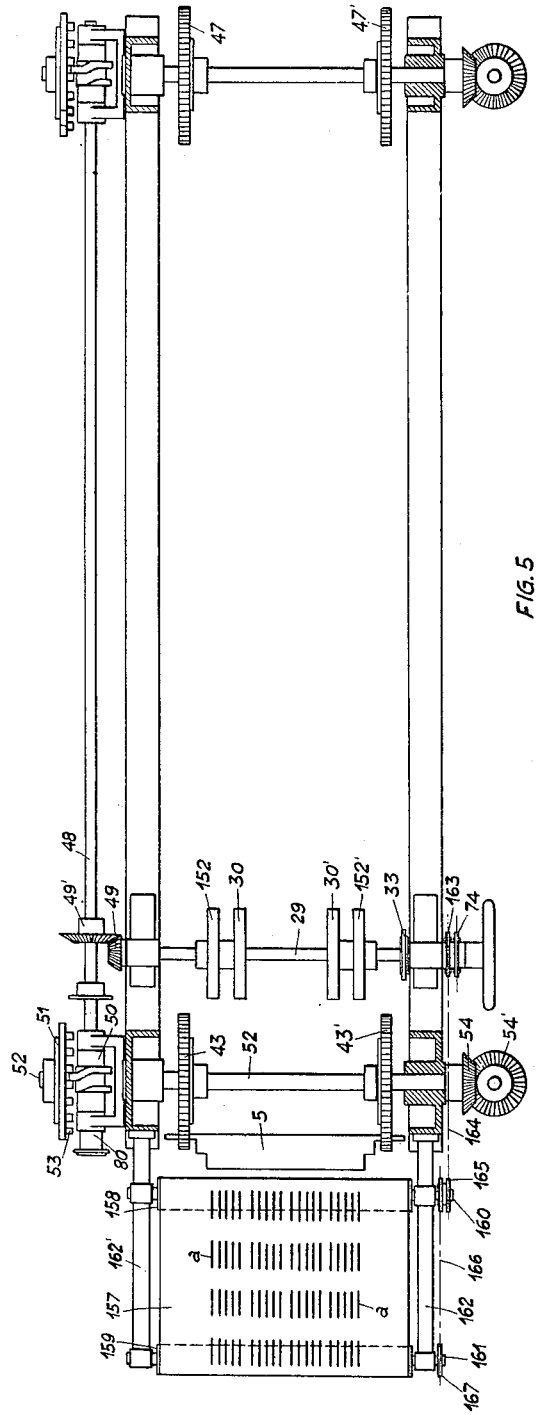
Fig. 5 is a horizontal section of the machine through the line 5—5 in Fig. 4, showing specially the transmission and drive.
Figure 19:
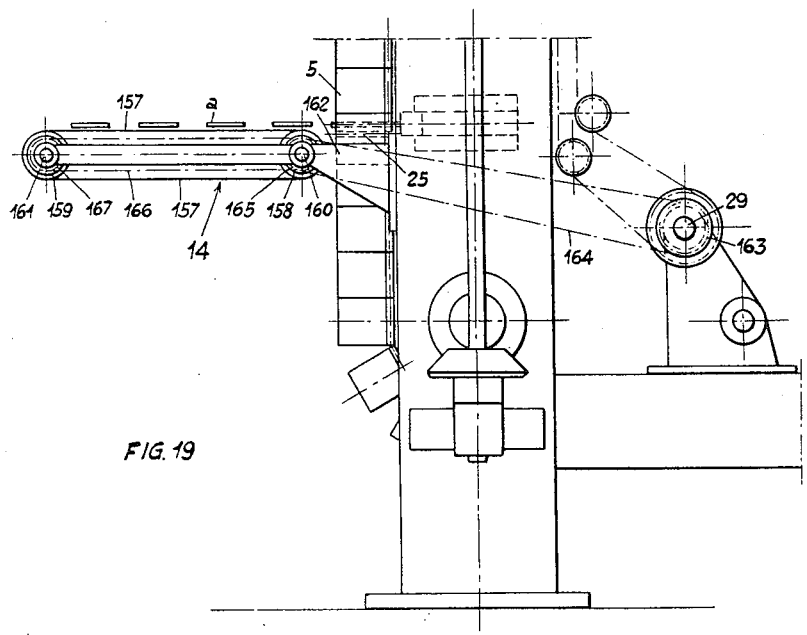
Fig. 19 is a diagrammatic view shown in elevation of the off loader conveyor for the capped cigarettes.

The rhythmic motion is given to the bar 150 by the cams 152—152' (Fig. 5) through the roller 153 (Fig. 3), the lever 154 and the link 155 which is connected to the bar 150 sliding on the guides 156 and 156'. The twenty cigarettes ejected by the ejector from a row of holes 25 of the conveyor elements 5, fall onto a conveyor belt 157 underneath (Fig. 3) which runs on rollers 158 and 159. These rollers 158 and 159 (Fig. 19) are mounted on, respectively, small shafts 160 and 161 which are carried in supports 162—162' (Fig. 5). The roller 158 is driven from the shaft 29 (Figs. 5 and 19), already described, through the toothed wheel 163 which is keyed to the shaft 29 itself, by the chain 164 and the double toothed wheel 165 keyed to its respective shaft 160. The roller 159 is driven by the double toothed wheel 165, through the transmission chain 166 and the toothed wheel 167 which is keyed to its shaft 161.

The twenty cigarettes $a$ which are unloaded at the same time at each stroke of the machine onto the off loading conveyor belt 157 can be collected from time to time by a labourer whose work it is to collect these for packeting directly or for arrangement in a collector box.

I claim:

1. Apparatus for producing igniter tip cigarettes automatically and continuously comprising a conveyor system, said conveyor system comprising a plurality of conveyor system elements, each element being arranged on said conveyor system independently of the other elements, said elements being provided with a plurality of apertures extending through said elements, means mounted adjacent said conveyor system for loading cigarettes into said apertures, means for actuating said cigarette loaded elements continuously at a predetermined speed, means for applying an adhesive to one end of the cigarettes in said elements as said elements are being actuated at said predetermined speed, means for supplying igniter strips adjacent said conveyor system, means for actuating individually said adhesively treated cigarette loaded elements intermittently adjacent said igniter strip supply means, means for punching discs out of said strips and forcing them onto the adhesive treated ends of the cigarettes, means for holding firmly said discs on the ends of the cigarettes for a predetermined time, means mounted adjacent said conveyor system for unloading said igniter tip cigarettes from said elements, and means for intermittently actuating said igniter tip cigarette loaded elements adjacent said unloading means.

2. Apparatus for producing igniter tip cigarettes automatically and continuously comprising a conveyor system, said conveyor system comprising a plurality of conveyor system elements, each element being arranged on said conveyor system independently of the other elements, said elements being provided with a plurality of parallelly arranged apertures extending through said elements, means mounted adjacent said conveyor system for supplying and intermittently loading cigarettes into said apertures, means for intermittently actuating individually each of said elements adjacent said loading means, means for actuating said cigarette loaded elements continuously at a predetermined speed, means for applying an adhesive to one end of the cigarettes in said elements as said elements are being actuated at said predetermined speed, means for supplying igniter strips adjacent said conveyor system, means for actuating individually said adhesively treated cigarette loaded elements intermittently adjacent said igniter strip supply means, means for punching discs out of said strips and forcing them onto the adhesively treated ends of the cigarettes, means for pressing firmly said discs on the ends of the cigarettes during the intermittent travel of said elements, means mounted adjacent said conveyor system for unloading said igniter tip cigarettes from said elements, and means for intermittently actuating said igniter tip cigarette loaded elements adjacent said unloading means.

3. Apparatus for producing igniter tip cigarettes automatically and continuously comprising a conveyor system, said conveyor system comprising a plurality of conveyor system elements, each element being arranged on said conveyor system independently of the other elements, said elements being provided with a plurality of parallelly arranged apertures extending through said elements, spring means mounted within said apertures for firmly gripping cigarettes forced therein, means mounted adjacent said conveyor system for supplying and intermittently loading cigarettes into said apertures, means for intermittently actuating individually each of said elements adjacent said loading means, means for actuating said cigarette loaded elements continuously at a predetermined speed, means for applying an adhesive to one end of the cigarettes in said elements as said elements are being actuated at said predetermined speed, means for supplying igniter strips adjacent said conveyor system, means for actuating individually said adhesively treated cigarette loaded elements intermittently adjacent said igniter strip supply means, means for punching discs out of said strips and forcing them onto the adhesively treated ends of the cigarettes, means for holding firmly said discs on the ends of the cigarettes for a predetermined time, means mounted adjacent said conveyor system for unloading said igniter tip cigarettes from said elements, and means for intermittently actuating said igniter tip cigarette loaded elements adjacent said unloading means.

4. Apparatus for producing igniter tip cigarettes automatically and continuously comprising a conveyor system, said conveyor system comprising a plurality of conveyor system elements, each element being arranged on said conveyor system independently of the other elements, said elements each being provided with a plurality of apertures extending through said elements, said apertures in each element being arranged in parallel rows, said rows in each element being spaced at the same distance apart, spring means mounted within said apertures for firmly gripping the cigarettes forced therein, means mounted adjacent said conveyor system for supplying and intermittently loading cigarettes into said apertures, means for intermittently actuating individually each of said elements adjacent said loading means, means for actuating said loaded cigarette elements continuously at a predetermined speed, means for applying an adhesive to one end of the cigarettes in said elements as said elements are being actuated at said predetermined speed, means for supplying igniter strips adjacent said conveyor system, means for actuating individually said adhesively treated cigarette loaded elements intermittently adjacent said igniter strip supply means, means for punching discs out of said strips and forcing them onto the adhesively treated ends of the cigarettes, means for holding firmly said discs on the ends of the cigarettes for a predetermined time, means mounted adjacent said conveyor system for unloading said igniter tip cigarettes from said elements, and means for intermittently actuating said igniter tip cigarette loaded elements adjacent said unloading means.

5. Apparatus for producing igniter tip cigarettes automatically and continuously comprising a conveyor system, said conveyor system comprising a plurality of conveyor system elements, each element being arranged on said conveyor system independently of the other elements, said elements being provided with a plurality of apertures extending through said elements, said apertures in each element being arranged in parallel rows, said rows in each element being spaced at the same distance apart, spring means mounted within said apertures for firmly gripping the cigarettes forced therein, means mounted adjacent said conveyor system for supplying and intermittently loading cigarettes into said apertures, means for intermittently actuating individually each of said elements adjacent said loading means and after being loaded actuating said elements beyond said loading means, means for aligning the ends of the cigarettes in said elements in a given plane, means for actuating said loaded elements continuously at a predetermined speed, means for applying an adhesive to one end of the cigarettes in said elements as said elements are being actuated at said predetermined speed, means for supplying igniter strips adjacent said conveyor system, means for actuating individually said adhesively treated cigarette loaded elements intermittently adjacent said igniter strip supply means, means for punching discs out of said strips and forcing them onto the adhesively treated ends of the cigarettes, means for holding firmly said discs on the ends of the cigarettes for a predetermined time, means mounted adjacent said conveyor system for unloading said igniter tip cigarettes from said elements, and means for intermittently actuating said igniter tip cigarette loaded elements adjacent said unloading means.

6. Apparatus for producing igniter tip cigarettes automatically and continuously comprising a conveyor system, said conveyor system comprising a plurality of conveyor system elements, each element being arranged on said conveyor system independently of the other elements, said elements being provided with a plurality of apertures extending through said elements, said apertures in each element being arranged in parallel rows, said rows in each element being spaced at the same distance apart, spring means mounted within said apertures for firmly gripping the cigarettes forced therein, means mounted adjacent said conveyor system for supplying and intermittently loading cigarettes into said apertures, means for intermittently actuating individually each of said elements adjacent said loading means and after being loaded actuating said elements beyond said loading means, means for aligning the ends of the cigarettes in said elements in a given plane, means for actuating said loaded elements continuously at a predetermined speed, means for applying an adhesive to one end of the cigarettes in said elements as said elements are being actuated at said predetermined speed, means for supplying igniter strips adjacent said conveyor system, means for actuating individually said adhesively treated cigarette loaded elements intermittently adjacent said igniter strip supply means, means for punching discs out of said strips and forcing them onto the adhesively treated ends of the cigarettes, means for actuating said igniter tip cigarette loaded elemens intermittently at another speed, means for pressing firmly said discs on the ends of the cigarettes after the travel of said elements at said other speed, means mounted adjacent said conveyor system for unloading said igniter tip cigarettes from said elements, and means for intermittently actuating said igniter tip cigarette loaded elements adjacent said unloading means.

7. Apparatus for producing igniter tip cigarettes automatically and continuously comprising a conveyor system, said conveyor system comprising a plurality of conveyor system elements, each element being arranged on said conveyor system independently of the other elements, said elements comprising parallel sided blocks of rigid material each provided with a plurality of apertures extending through said elements, said apertures in each element being arranged in parallel rows, said rows in each element and adjacent rows in adjacent engaging elements being equally spaced from each other, spring means mounted within said apertures for firmly gripping the cigarettes forced therein, means mounted adjacent said conveyor system for supplying and intermittently loading cigarettes into said apertures, means for intermittently actuating individually each of said elements adjacent said loading means and after being loaded actuating said elements beyond said loading means, means for aligning the ends of the cigarettes in said elements in a given plane, means for actuating said loaded elements continuously at a predetermined speed, means for applying an adhesive to one end of the cigarettes in said elements as said elements are being actuated at said predetermined speed, means for supplying igniter strips adjacent said conveyor system, means for actuating individually said adhesively treated cigarette loaded elements intermittently adjacent said igniter strip supply means, means for punching discs out of said strips and forcing them onto the adhesively treated ends of the cigarettes, means for actuating said igniter tip cigarette loaded elements intermittently at another speed, means for pressing firmly said discs on the ends of the cigarettes after the travel of said elements at said other speed, means mounted adjacent said conveyor system for unloading said igniter tip cigarettes from said elements, and means for intermittently actuating said igniter tip cigarette loaded elements adjacent said unloading means.

8. A machine for automatically and continuously applying igniter discs to the ends of cigarettes comprising a framework, a track mounted on said framework, a conveyor means mounted on said track, said conveyor means comprising a plurality of conveyor elements, each element being arranged on said conveyor means independently of the other elements, said elements comprising blocks of rigid material having projections extending laterally from the ends of said blocks and slidably mounted on said track, said elements being provided with a plurality of apertures extending through said elements and arranged in parallel rows, said rows in each element and adjacent rows in engaging elements being equally spaced from each other, means mounted adjacent said conveyor means for supplying and intermittently loading cigarettes into said apertures, means for intermittently actuating individually each of said elements adjacent said loading means, means for actuating said loaded elements continuously at a predetermined speed, means for applying adhesive to one end of the cigarettes in said elements as said elements are being actuated at said predetermined speed, means for supplying igniter strips adjacent said conveyor means, means for actuating individually said adhesively treated cigarette loaded elements intermittently adjacent said igniter strip supply means, means for punching discs out of said strips and forcing them onto the adhesively treated ends of the cigarettes, means for holding firmly said discs on the ends of the cigarettes for a predetermined time, and means mounted adjacent said conveyor means for unloading said igniter tip cigarettes from said elements, said means for intermittently actuating said elements adjacent said loading means also intermittently actuating said igniter tip cigarette loaded elements adjacent said unloading means.

9. The combination set forth in claim 8 wherein each of said elements is provided with slots cut tangentially through adjacent apertures in adjacent rows of apertures, and in further combination with U-shaped spring means arranged in said slots, said legs of each U-shaped spring means projecting into adjacent apertures for firmly gripping cigarettes forced therein.

10. The combination set forth in claim 8 wherein said cigarette supplying and loading means comprises a hopper, partition means arranged in said hopper for aligning said cigarettes in a predetermined manner, and presser means arranged adjacent said hopper for pushing said cigarettes from said hopper into said apertures in said elements, said presser means pushing the cigarettes in one side of said elements and through said apertures until said cigarettes project a predetermined distance from the opposite side of said elements.

11. The combination set forth in claim 8 in further combination with levelling means comprising a leveller bar which aligns the ends of the cigarettes in said elements in a given plane exactly in the interval between intermittent movements of said elements before said elements are actuated by said continuous movement actuating means.

12. A machine for automatically and continuously applying igniter discs to the ends of cigarettes comprising a framework, a track mounted on said framework, a conveyor means mounted on said track, said conveyor means comprising a plurality of conveyor elements, each element being arranged on said conveyor means independently of the other elements, said elements comprising parallel sided blocks of rigid material having T-shaped projections extending laterally from the ends of said blocks and slidably mounted on said track, said elements being provided with a plurality of apertures extending through said elements and arranged in parallel rows, said rows in each element and adjacent rows in engaging elements being equally spaced from each other, means mounted adjacent said conveyor means for supplying and intermittently loading cigarettes into said apertures, sprocket means engaging said T-shaped projections for intermittently actuating individually each of said elements adjacent said loading means, sprocket means engaging said T-shaped projections for actuating said loaded elements continuously at a predetermined speed, means for applying adhesive to one end of the cigarettes in said elements as said elements are being actuated at said predetermined speed, means for supplying igniter strips adjacent said conveyor means, sprocket means engaging said T-shaped projections for actuating individually said adhesively treated cigarette loaded elements intermittently adjacent said igniter strip supply means, means for punching discs out of said strips and forcing them onto the adhesively treated ends of the cigarettes, and means mounted adjacent said conveyor means for unloading said igniter tip cigarettes from said elements, said first mentioned sprocket means engaging said T-shaped projections for intermittently actuating said igniter tip cigarette loaded elements adjacent said unloading means.

13. A machine for automatically and continuously applying igniter discs to the ends of cigarettes comprising a framework, a track mounted on said framework, a conveyor means mounted on said track, said conveyor means comprising a plurality of conveyor elements, each element being arranged on said conveyor means independently of the other elements, said elements comprising parallel sided blocks of rigid material having T-shaped projections extending laterally from the ends of said blocks and slidably mounted on said track, said elements being provided with a plurality of apertures extending through said elements and arranged in parallel rows, said rows in each element and adjacent rows in engaging elements being equally spaced from each other, means mounted adjacent said conveyor means for supplying and intermittently loading cigarettes into said apertures, means for intermittently actuating individually each of said elements adjacent said loading means, means for actuating said loaded elements continuously at a predetermined speed, adjustably mounted means for applying adhesive to one end of the cigarettes in said elements as said elements are being actuated at said predetermined speed, means for supplying igniter strips adjacent said conveyor means, means for actuating individually said adhesively treated cigarette loaded elements intermittently adjacent said igniter strip supply means, means for punching discs out of said strips and forcing them onto the adhesively treated ends of the cigarettes, means for actuating said igniter tip cigarette loaded elements intermittently at another speed, means for pressing firmly said discs on the ends of the cigarettes after the travel of said elements at said other speed, and means mounted adjacent said conveyor means for unloading said igniter tip cigarettes from said elements, said means for intermittently actuating said elements adjacent said loading means also intermittently actuating said igniter tip cigarette loaded elements adjacent said unloading means.

14. A machine for automatically and continuously applying igniter discs to the ends of cigarettes comprising a framework, a track mounted on said framework, a conveyor means mounted on said track, said conveyor means comprising a plurality of conveyor elements, each element being arranged on said conveyor means independently of the other elements, said elements comprising blocks of rigid material having T-shaped projections extending laterally from the ends of said blocks and slidably mounted on said track, said elements being provided with a plurality of apertures extending through said elements and arranged in parallel rows, said rows in each element and adjacent rows in engaging elements being equally spaced from each other, means mounted adjacent said conveyor means for supplying and intermittently loading cigarettes into said apertures, means for intermittently actuating individually each of said elements adjacent said loading means, means for actuating said loaded elements continuously at a predetermined speed, means for applying adhesive to one end of the cigarettes in said elements as said elements are being actuated at said predetermined speed, means for supplying igniter strips adjacent said conveyor means, said igniter strip supply means comprising a plurality of feeder tracks, said tracks being equal in number to the number of rows in each element, a feeder bar provided on each track for alternately engaging said strip and actuating it to a punching means and for releasing said strip and returning to its original position for another feeding operation, and means for actuating said igniter strip supply means, means for actuating individually said adhesively treated cigarette loaded elements intermittently adjacent said igniter strip supply means, means for punching discs out of said strips and forcing them onto the adhesively treated ends of the cigarettes, and means mounted adjacent said conveyor means for unloading said igniter tip cigarettes from said elements, said means for intermittently actuating said elements adjacent said loading means also intermittently actuating said igniter tip cigarette loaded elements adjacent said unloading means.

15. The combination set forth in claim 14 in further combination with spring clamps for holding said bar against said strips during the feeding stroke of said igniter strip supply means, and means for releasing said clamps during the return stroke of said igniter strip supply means to its original position.

16. A machine for automatically and continuously applying igniter discs to the ends of cigarettes comprising a framework, a track mounted on said framework, a conveyor means mounted on said track, said conveyor means comprising a plurality of conveyor elements, each element being arranged on said conveyor means independently of the other elements, said elements comprising parallel sided blocks of rigid material having T-shaped projections extending laterally from the ends of said blocks and slidably mounted on said track, said elements being provided with a plurality of apertures extending through said elements and arranged in parallel rows, said rows in each element and adjacent rows in engaging elements being equally spaced from each other, means mounted adjacent said conveyor means for supplying and intermittently loading cigarettes into said apertures, means for intermittently actuating individually each of said elements adjacent said loading means, means for actuating said loaded elements continuously at a predetermined speed, means for applying adhesive to one end of the cigarettes in said elements as said elements are being actuated at said predetermined speed, means for supplying igniter strips adjacent said conveyor means, means for actuating individually said adhesively treated cigarette loaded elements intermittently adjacent said igniter strip supply means, means for punching discs out of said strips and forcing them onto the adhesively treated ends of the cigarettes between each feed step of said actuating means for said adhesively treated cigarette loaded elements, means for actuating said igniter tip cigarette loaded elements intermittently at another speed, means for pressing firmly said discs on the ends of the cigarettes after the travel of said elements at said other speed, and means mounted adjacent said conveyor, means for unloading said igniter tip cigarettes from said elements, said means for intermittently actuating said elements adjacent said loading means also intermittently actuating said igniter tip cigarette loaded elements adjacent said unloading means.

17. The combination set forth in claim 16 in which said disc punching means comprises an apertured plate mounted on said framework and a plurality of punches mounted on said plate for reciprocating vertical movement through said apertures of said plate, said punches being aligned with said apertures in said elements.

18. A machine for automatically and continuously applying igniter discs to the ends of cigarettes comprising a framework, a track mounted on said framework, a conveyor means mounted on said track, said conveyor means comprising a plurality of conveyor elements, each element being arranged on said conveyor means independently of the other elements, said elements comprising parallel sided blocks of rigid material having T-shaped projections extending laterally from the ends of said blocks and slidably mounted on said track, said elements being provided with a plurality of apertures extending through said elements and arranged in parallel rows said rows in each element and adjacent rows in engaging elements being equally spaced from each other, means mounted adjacent said conveyor means for supplying and intermittently loading cigarets into said apertures, means for intermittently actuating individually each of said elements adjacent said loading means at a first speed, means for actuating said loaded elements continuously at a second speed, means for applying adhesive to one end of the cigarettes in said elements as said elements are being actuated at said second speed, means for supplying igniter strips adjacent said conveyor means, means for actuating individually said adhesively treated cigarette loaded elements intermittently adjacent said igniter strip supply means at said first speed, means for punching discs out of said strips and forcing them onto the adhesively treated ends of the cigarettes, means for actuating said igniter tip cigarette loaded elements intermittently at a third speed, means for pressing firmly said discs on the ends of the cigarettes after the travel of said elements at said third speed, said third speed being a multiple of the intermittent speed of each step of said first speed, said presser means comprising a plurality of spring biased presser elements which are equal in number, dimensions and spacing to the cigarettes contained in an element, said presser elements engaging the discs on the cigarettes and remaining in contact with said igniter tip cigarettes for a predetermined time, and means mounted adjacent said conveyor means for unloading said igniter tip cigarettes from said elements, said means for intermittently actuating said elements adjacent said loading means also intermittently actuating said igniter tip cigarette loaded elements adjacent said unloading means.

References Cited in the file of this patent

UNITED STATES PATENTS

| 399,808 | Whitaker | Mar. 19, 1889 |
| 405,044 | Manahan | June 11, 1889 |
| 989,778 | Hammitt | Apr. 18, 1911 |
| 1,143,385 | Haberle | June 15, 1915 |
| 1,999,910 | May | Apr. 30, 1935 |

FOREIGN PATENTS

| 313,428 | Great Britain | June 10, 1929 |
| 352,082 | Great Britain | July 6, 1931 |
| 370,502 | Italy | Apr. 18, 1939 |
| 395,748 | France | Jan. 6, 1909 |